United States Patent [19]
Kurilkin et al.

[11] 3,964,968
[45] June 22, 1976

[54] NUCLEAR REACTOR FUEL ASSEMBLY

[76] Inventors: Vitaly Vitalievich Kurilkin, ulitsa Shalyapina, 15, kv. 14; Evgeny Vasilievich Kusmartsev, ulitsa Sovnarkomovskaya, 32, kv. 13, both of Gorky, U.S.S.R.

[22] Filed: Sept. 9, 1974

[21] Appl. No.: 504,231

[52] U.S. Cl.................................... 176/81; 176/78
[51] Int. Cl.².......................................... G21C 3/12
[58] Field of Search................................ 176/81, 78

[56] References Cited
UNITED STATES PATENTS

| | | | |
|---|---|---|---|
| 3,361,640 | 1/1968 | Hassig et al............................ | 176/81 |
| 3,629,066 | 12/1971 | Anderson et al..................... | 176/81 |
| 3,798,125 | 3/1974 | Skok..................................... | 176/81 |

*Primary Examiner*—Harvey E. Behrend

[57] ABSTRACT

A nuclear reactor fuel assembly, wherein at least some of the fuel elements are provided with spacer members. The spacer members are arranged in a helical line on the lateral surface of each of said fuel elements having spacer members. A spacer member is formed as a bunch of wires, with each wire adjoining at least two neighboring wires along the entire length thereof, and with all the wires of a bunch being rigidly interconnected between the planes of contact of said bunch with the fuel elements disposed adjacent the one whereon said bunch of wires is disposed.

1 Claim, 8 Drawing Figures

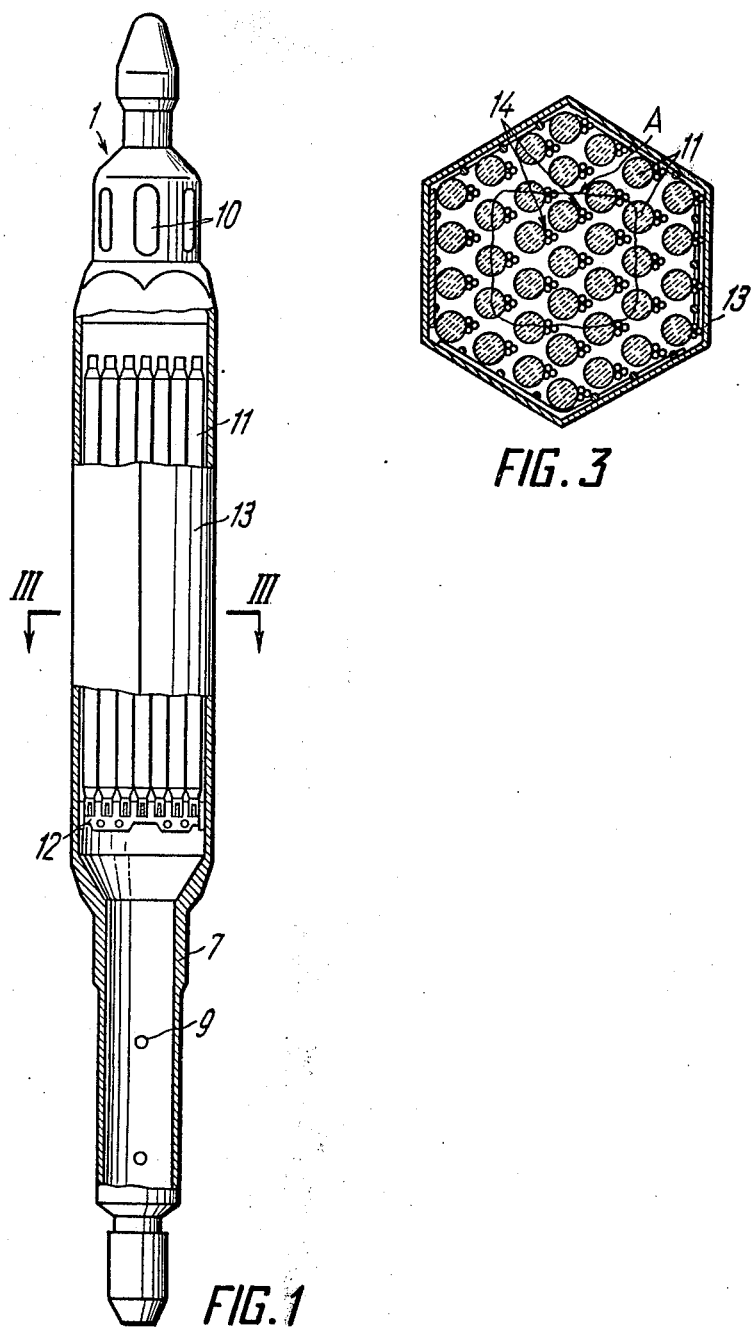

NUCLEAR REACTOR FUEL ASSEMBLY

The present invention relates to nuclear reactors, and, more particularly, to a nuclear reactor fuel assembly primarily employed in fast reactors with a liquid-metal heat transfer fluid.

BACKGROUND OF THE INVENTION

It is known in the art to employ a nuclear reactor fuel assembly wherein at least some of the fuel elements are provided with spacer members, each formed as a wire arranged in a helical line on the lateral surface of each of said fuel elements and adjoining, in the contact planes, the fuel elements in immediate proximity to those fuel elements which carry said spacer members. This practice is used in most operating fast reactors with a sodium coolant.

The spacer member used herein is a structural element designed for space fixation of fuel elements.

In the fuel assembly of this type of reactor, the spacer member is formed as a single wire fixed on the ends of each fuel element, and forcibly wound in a helical line about the lateral surface thereof. Each fuel element of the fuel assembly is fixed at a required number of points, vertically and perimetrically, through contact with the spacer members disposed on the adjacent fuel elements.

It is obvious from the above that with such a design of the fuel assembly, a modification of the principle is possible whereby only some, but not all, of the fuel elements are provided with spacer members.

The spacer member formed as a single wire helically arranged on the lateral surface of the fuel element is of fairly simple design, but one which nevertheless provides for the required tightness for the packing of the fuel elements in the fuel assembly and for their secure fixation, as well as for satisfactory thermal and hydraulic characteristics of the fuel assembly as a whole. These advantages account for the wide popularity of the foregoing fuel assembly design in the world reactor-manufacturing industry.

As far as high-power fast reactors are concerned, however, the core elements are exposed to entirely different conditions and altogether new operating factors are involved. Thus, exposure to high integrated neutron fluxes (on the order of $10^{23}$ 1/sq.cm. and higher), typical of such reactors, causes the jackets of the fuel elements to swell to a considerable degree, with their outer diameter increasing by as much as several percent ($\Delta\ d/d_0$). In the above-described fuel assembly, the resultant lateral deformation of the fuel elements will cause an inadmissible degree of deformation of the assembly housing and induce additional contact stresses in the jackets of the fuel elements contacting one another by way of the highly rigid spacer members, with the result that the possible service life of the fuel elements will be severely shortened, the fuel cycle costs raised and the general reactor economics adversely affected.

SUMMARY OF THE INVENTION

It is an object of the present invention to provide a nuclear reactor fuel assembly of such a design that would ensure a longer service life of the constituent fuel elements.

The foregoing object is attained by the fact that in a nuclear reactor fuel assembly, wherein at least some of the fuel elements are provided with spacer members formed as a wire arranged in a helical line on the lateral surface of those fuel elements and adjoining, in planes of cntact, the adjacent fuel elements, in accordance with the invention, each spacer member is provided with at least two additional wires which together with the main wire define a bunch of wires, wherein each of the wires adjoins at least two adjacent wires along the entire length thereof, with all the wires being rigidly interconnected between said planes of contact.

The proposed nuclear reactor fuel assembly ensures a longer service life for its cnstituent fuel elements, and is also conductive to a more economical fuel cycle for high speed breeder power reactors wherein it is employed.

BRIEF DESCRIPTION OF THE DRAWINGS

The invention will be better understood from the following detailed description of specific embodiments thereof taken in conjunction with the accompanying drawings, wherein:

FIG. 1 is a longitudinal sectin of a nuclear reactor fuel assembly, in accordance with the invention;

FIG. 3 is a sectional view of the proposed fuel assembly taken on the line III—III in FIG. 1;

DESCRIPTION OF THE PREFERRED EMBODIMENTS

Figure 4:
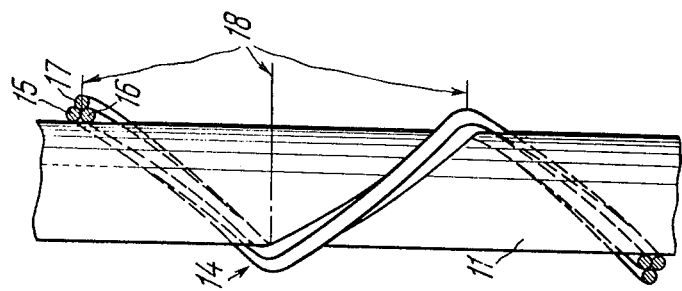
FIG. 4 is a view of a portion of a fuel element carrying a spacer member, in accordance with the invention.

Referring now to the drawings, a fuel assembly 1 in accordance with the invention (FIG. 1) is installed in a nuclear reactor 2 (FIG. 2), in a core 3 of the reactor 2. In the embodiment in question, the nuclear reactor 2 is a fast reactor with a liquid-metal heat transfer fluid. The core 3 of the reactor 2 is surrounded by axial blankets 4, with a lateral blanket 5 and a neutron shielding 6.

Figure 2:
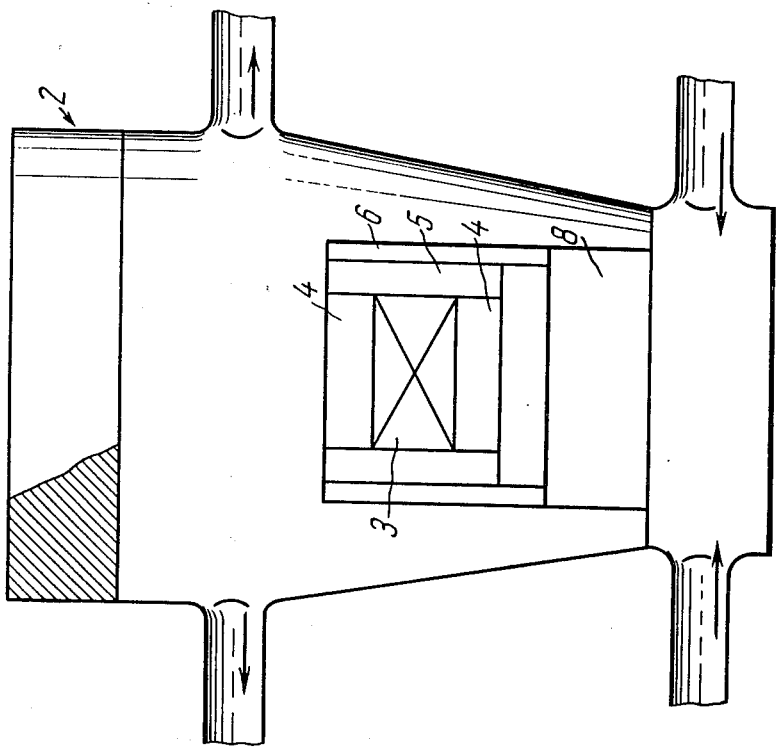
FIG. 2 is a longitudinal section of a nuclear reactor with the proposed fuel assembly.

The fuel assemblies 1 (FIG. 1) are secured in a plenum chamber 8 (FIG. 2) of the reactor 2 by way of stems 7. The stem 7 (FIG. 1) has openings 9 formed therein, wherethrough the heat transfer medium is delivered into the assembly 1 from the chamber 8 (FIG. 2). In the upper portion of the assembly 1 (FIG. 1) parts 10 are formed wherethrough the heat transfer medium is drained from the assembly 1.

Figure 5:
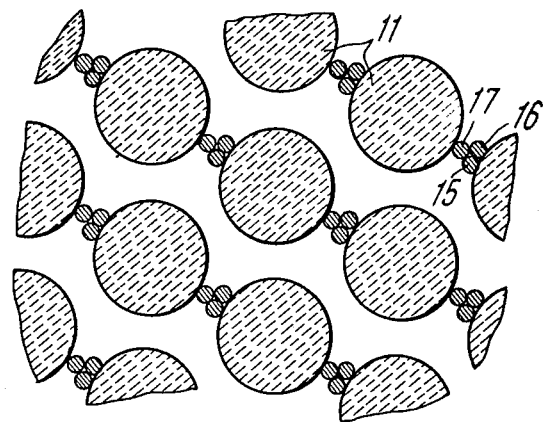
FIG. 5 is an enlarged view of the portion A of the fuel assembly shown in FIG. 3.

Inside the assembly 1 there are housed fuel elements 11 secured in a support grid 12 installed in the lower portion of a housing 13 of the assembly 1. The fuel elements 11 are spatially fixed within the assembly 1 by means of spacer members 14 (FIG. 3), each formed as a bunch of wires disposed on the lateral surface of the fuel element 11 (FIG. 4) and arranged in a helical line. The bunch comprises three wires 15, 16 and 17, each of which adjoins the other two along the entire length thereof. The wires 15 and 16 (FIG. 5) constitute the base of the bunch adjoining the jacket of the fuel element 11 whereon they are disposed, whereas the third wire 17 is disposed externally in the space defined by the wires 15 and 16, and adjoins the adjacent fuel elements 11.

In the embodiment being described, the wires 15, 16 and 17 are rigidly interconnected by welding between planes 18 (FIG. 4) of contact with the fuel elements 11 adjacent the fuel element 11 whereon said wires 15, 16 and 17 are disposed.

The pitch of the helical line in which the spacer member is arranged is selected in each case so to provide the specified number of bearing points along the length of the fuel element.

As has been earlier noted, the wires 15, 16 and 17 are interconnected only between the planes 18 of contact with the adjacent fuel elements 11, so that the wire 17 may be driven by transverse stresses to separate the wires 15 and 16 in the planes 18, enter the space thereby defined by the wires 15 and 16, and move therebetween as far as making contact with the surface of the fuel element 11 whereon said spacer member is disposed.

The rigidity of the spacer member, which underlies its ability to undergo deformation under the effects of a certain transverse stress, may be varied by varying the distance from the junction of the bunch wires to the nearest plane of contact.

The fuel element spacing in the assembly is selected so as to provide for normal cooling of the fuel elements throughout the entire service life of the assembly in the reactor, which is determined by the bunch wire diameter and may be varied within broad limits. On the other hand, the lateral compressibility, or travel of the spacer member depends only on the diameter of the external wire which may differ from the diameter of the other wires in the bunch.

An alternative embodiment of the proposed nuclear reactor fuel assembly is possible which is similar to the one described hereabove and which comprises increasing the number of wires in the bunch.

Figure 6:
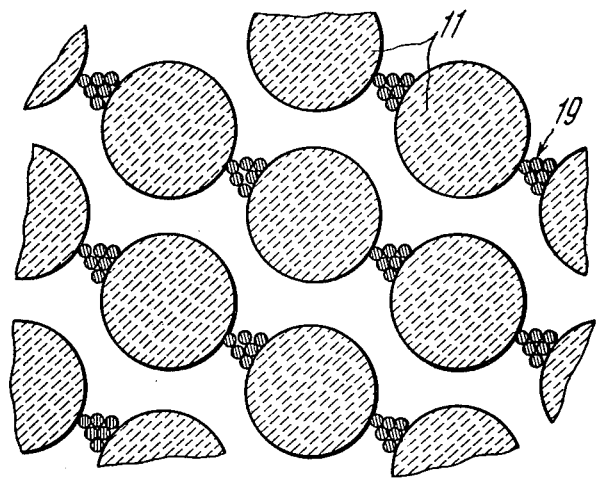
FIG. 6 illustrates a portion of an alternative embodiment of the proposed fuel assembly.

In this latter embodiment, a spacer member 19 (FIG. 6) is formed as a bunch of six wires, which makes it possible to additionally increase the lateral compressibility of this spacer member 19 by reducing the diameter of its wires required to provide for the predetermined spacing of the fuel elements in the assembly.

With the spacer membe arranged in a helical line, there is no need to fit each and every fuel element therewith, for the spacer member of one fuel element is in contact with the adjacent fuel elements, providing support therefor.

The latter consideration logically leads to yet another embodiment of the proposed nuclear reactor fuel assembly, similar to the first embodiment described hereabove.

Figure 7:
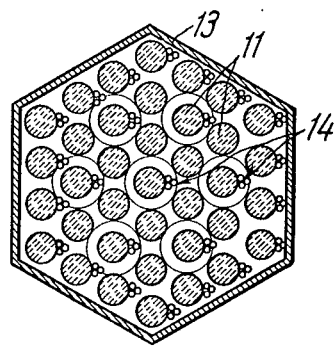
FIG. 7 is a cross-sectional view of yet another embodiment of the proposed nuclear reactor fuel assembly.

The distinguishing feature of the third embodiment resides in that the spacer members 14 (FIG. 7) are disposed on only some of the fuel elements, and provide support for all the fuel elements at least at three points along the perimeter thereof. In the embodiment being described, one out of every three fuel elements 11 is provided with a spacer member 14, with the pitch of the helical line in which the spacer member 14 being arranged is smaller than that selected for the first embodiment described hereabove.

Figure 8:
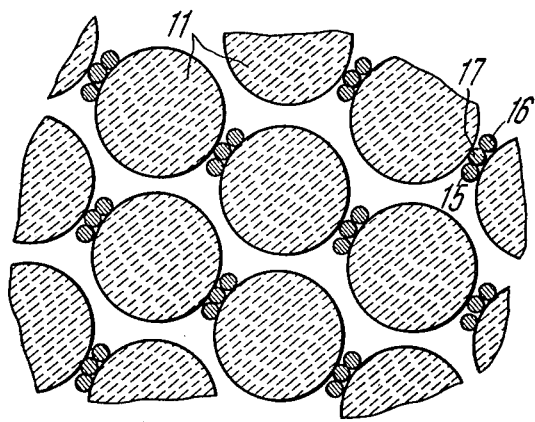
FIG. 8 is the view of FIG. 5, with the fuel elements and the spacer members of the proposed nuclear reactor fuel assembly shown maximally deformed.

The proposed nuclear reactor fuel assembly operates as follows:

In the course of operation of the fuel assembly 1 (FIG. 1) in the core 3 (FIG. 2) of the nuclear reactor 2, the fuel and the jackets of the fuel elements 11 (FIG. 59) undergo swelling, and hence increase in diameter. The resultant transverse stresses cause the spacer members 14 to be deformed. The external wire 17 of each spacer member 14 separates the wires 15 and 16, (FIG. 8) and enters into the space thus defined, thereby causing a considerable reduction in the contact stresses in the jackets of the fuel elements induced by the spacer members 14 acting thereupon. In their turn, the wires 15 and 16 tend to eject the wire 17, thereby imparting elasticity to the proposed spacer member 14 as a whole, so that the spacer member 14 continues to exert an effort on the adjacent fuel elements 11 required to keep the fuel elements uniformly spaced along the entire length of the assembly 1 (FIG. 1), thereby preventing local distortions of the geometry of the passage sections of the cells of the fuel elements 11 and maintaining constancy in the cooling conditions.

The second and third embodiments of the proposed fuel assembly operate in a similar manner.

With the proposed fuel assembly comprising spacer members formed as bunches of wires, the additional space can be provided between the fuel elements to take up the deformation of the fuel elements in the course of operation, with the size of the additional space being determined by the deforming capacity, or travel, of the spacer members.

The nuclear reactor fuel assembly of this invention affords the possibility, which being comparatively easy to realize, of obviating any geometrical distortions of the individual cells of the fuel elements, whatever the initial spacing thereof is provided, to make up for the swelling of the fuel elements as the fuel burns up. The proposed arrangement likewise prevents considerable contact stresses from arising in the fuel element cans any deformation, and bars transmitted by the fuel element to the housing of the fuel assembly in the course of its operation. Also local distortions of the passage section geometry is eliminated which otherwise cause local temperature increases in the jackets of the fuel elements.

All the above-mentioned advantages of the proposed fuel assembly are conducing to a longer service life of the fuel elements, and to improved economics of the fuel cycle of fast neutron power reactors employing the proposed fuel assembly. Furthermore, the design of the proposed fuel assembly is such tht it needs no appreciable changes in manufacturing procedures; also it requires small costs for its design and in testing purposes.

What is claimed is:

1. A fuel assembly for a nuclear reactor, comprising: a housing; fuel elements accommodated within said housing; a lateral surface of each of said fuel elements; spacer members, each of which is formed as a bunch of wires helically arranged on said lateral surface of at least some of said fuel elements; planes of contact, wherein said spacer members adjoin adjacent said fuel elements relative to those said fuel elements on which said spacer members are disposed; each of which said wires of said bunch of wires adjoins at least two adjacent wires along the entire length thereof; all said wires being rigidly interconnected between said planes of contact.

* * * * *